United States Patent

Muller et al.

[15] 3,642,021
[45] Feb. 15, 1972

[54] BLENDING VALVE

[72] Inventors: John Thomas Muller, Morris Plains; William L. Scull, Dover; James H. Cooper, Glen Rock; Curt A. Soderberg, Lake Hiawatha, all of N.J.

[73] Assignee: Leslie Co., Parsippany, N.J.

[22] Filed: Apr. 9, 1970

[21] Appl. No.: 26,826

[52] U.S. Cl.....................137/114, 137/505.21, 137/625.41
[51] Int. Cl..........................................................F16k 11/00
[58] Field of Search.................137/114, 112, 117, 494, 497, 137/505.21, 625.4, 625.41

[56] References Cited

UNITED STATES PATENTS

| 3,219,325 | 11/1965 | Brown | 137/625.4 |
| 3,212,526 | 10/1965 | Williams | 137/625.41 |
| 2,961,005 | 11/1960 | Ipsen | 137/625.41 |
| 3,473,571 | 10/1969 | Dugay | 137/625.41 |

*Primary Examiner*—Samuel B. Rothberg
*Assistant Examiner*—William H. Wright
*Attorney*—Pennie, Edmonds, Morton, Taylor and Adams

[57] ABSTRACT

There is disclosed an improved blending valve for a hot water system which provides automatic adjustment of tempered water output dependent upon the demand for water and in proportion to variations in temperature of hot water input to the blending valve.

6 Claims, 6 Drawing Figures

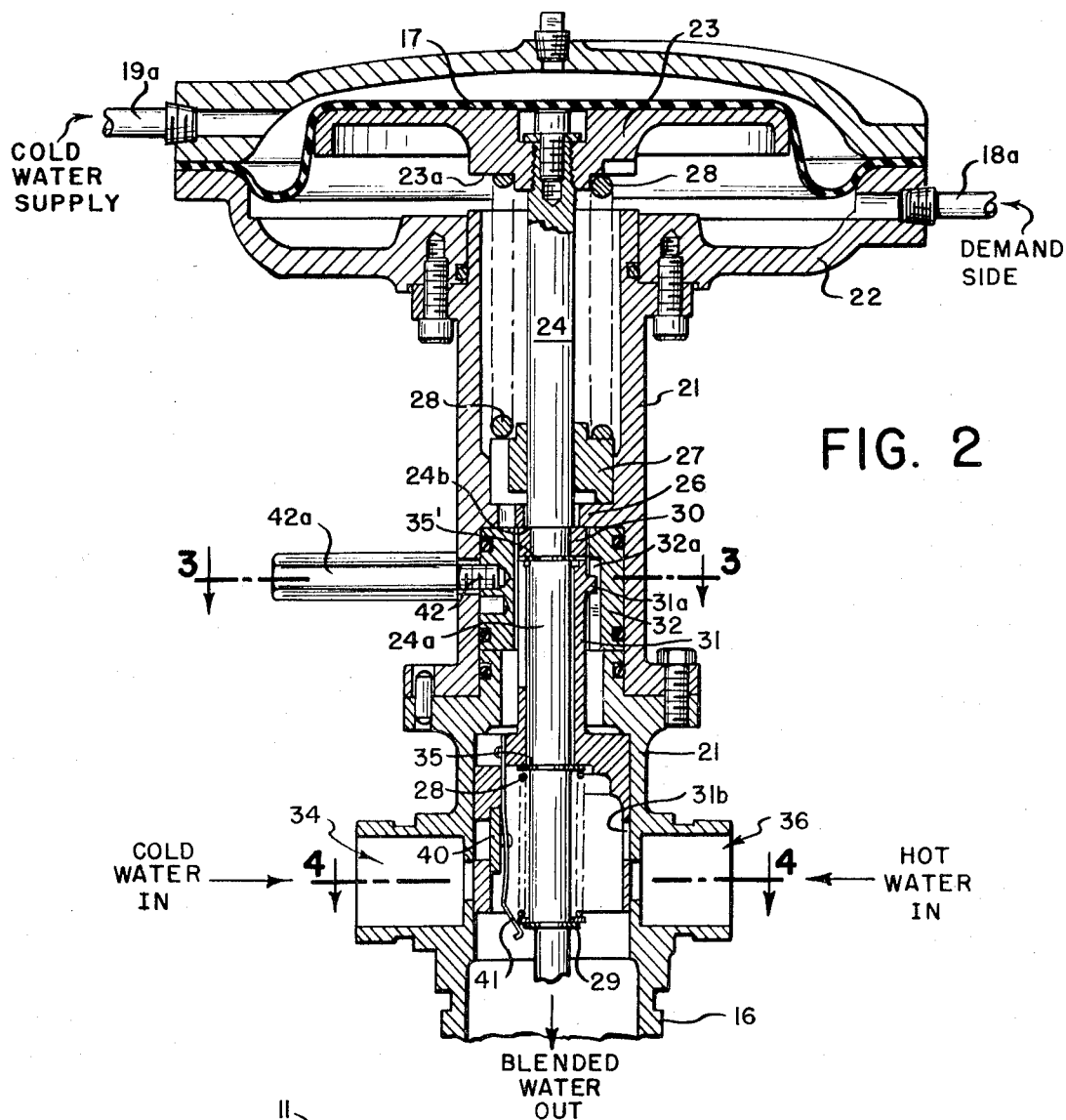
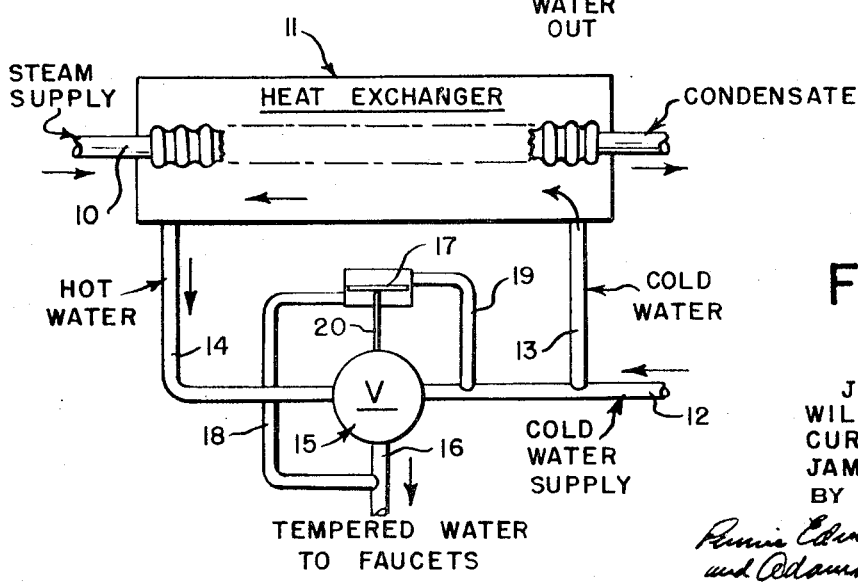

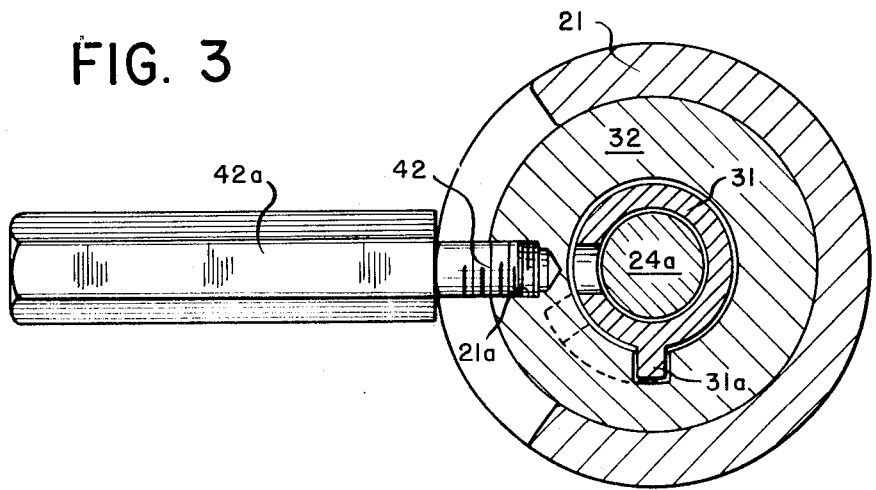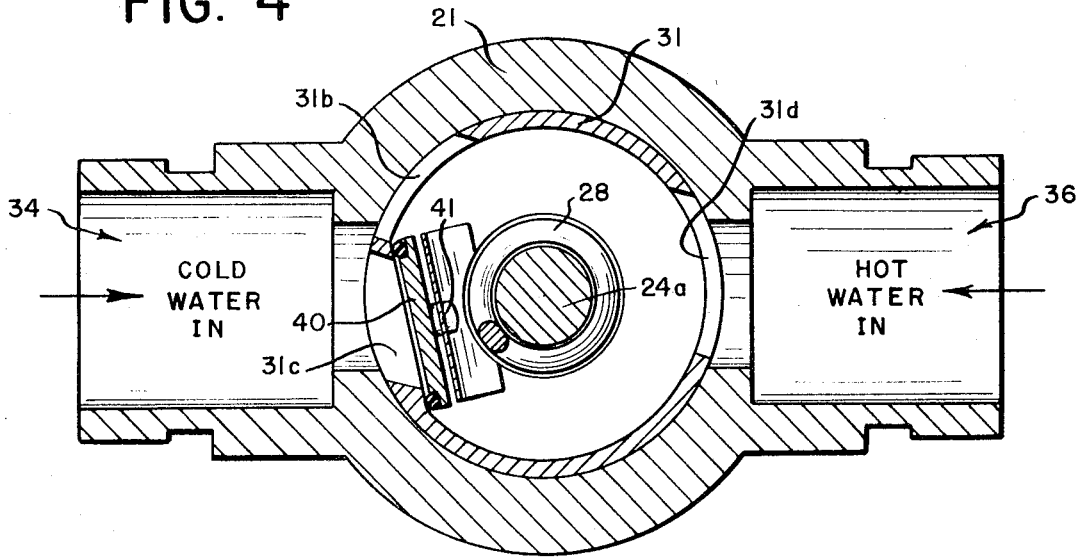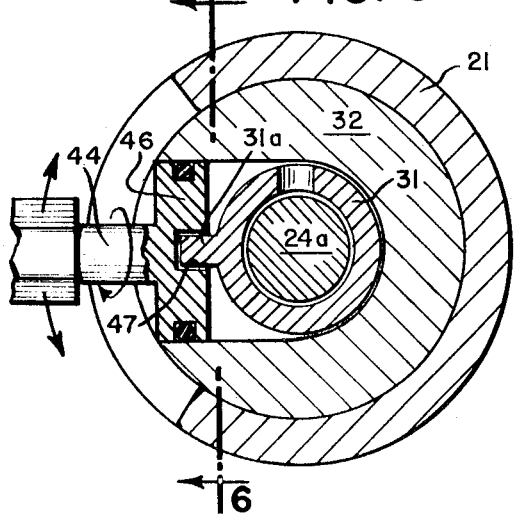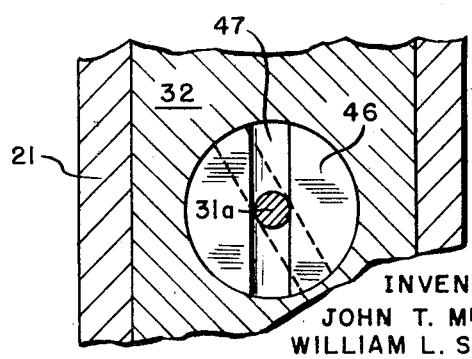

BLENDING VALVE

BACKGROUND OF THE INVENTION

In a heat exchanger for producing hot water supplied with a constant temperature heat source, the temperature of heated water produced varies in an inverse ratio to the volume of water passing through the exchanger. At a no-flow condition the temperature of the heated water will approach that of the heat source and at high flow rates, the temperature will drop to some point consistent with the rate of heat transfer. As an example; an exchanger heated by steam at 10 p.s.i.g. (239° F.) which receives cold water at an input temperature of 60° F., will at low water flows approaching 0gallons per minute heat the water to 239° F. As water flow is increased the temperature of the water delivered from the exchanger will decrease in an amount which will vary from exchanger to exchanger. For either process or domestic use, such variations present process problems and personal hazards.

If, for example, a hot water system as designed is required to provide water at a constant 140° F. delivered temperature, to accomplish this will require a mix of cold water and hot water at a temperature greater than 140° F. which mix must be varied to compensate for the aforementioned water variations in temperature of the hot water coming from the heat exchanger. If done with conventional temperature control feedback mixing systems variations from the delivered temperature as designed will result as the system attempts to correct for temperature error and attempts to cope with the lag due to heat transfer in the temperature-sensing system of the feedback loop and in the heat exchanger.

It is the purpose of the present invention to provide automatic adjustment of a mixture of hot and cold water dependent upon the demand for water and in proportion to the variations in temperature of the hot water from the heat exchanger.

SUMMARY OF THE INVENTION

According to the present invention, a hot water blending valve is provided of unique construction having means for holding the blended water temperature constant by simultaneously and automatically increasing or decreasing the proportions of hot and cold water in proportion to the flow demand on the system and the corresponding variations in output temperature from a heat exchanger which delivers hot water to the blending valve. More specifically, the blending valve includes a diaphragm movable in response to a differential between the system input pressure to the heat exchanger and the varying output pressure of heat-tempered water from the blending valve produced by different demand flow rates. Movement of the diaphragm causes axial translation of a valve stem and in turn both axial and rotational movement of the flow-metering valve member of the blending valve. The valve member is provided with ports adjacent respectively to cold and hot water inlets and axial and rotational movement of the valve member will change the effective size of the ports to produce different mixes of hot and cold water.

It is a further aspect of the blending valve of the present invention to provide means for increasing the flow of cold water should the valve member accidentally become stuck in a position corresponding to the maximum flow demand for hot water or some intermediate flow demand.

The invention also includes means for quickly and easily changing the setpoint temperature of the mixed water consistent with the new novel automatic control of blended water output temperature. Means are further provided to vary the rate of hot to cold water by an adjustment which permits presetting different such ratios.

These and other advantages of the invention will become apparent upon a detailed examination of the foregoing description and of the accompanying drawing.

BRIEF DESCRIPTION OF THE DRAWING

FIG. 1 is a schematic diagram showing the novel blending valve of the present invention incorporated in a system for the delivery of tempered hot water;

FIG. 2 is a side elevation in cross section of the novel blending valve of the present invention;

FIG. 3 is a cross section taken in the direction of arrows 3—3 of FIG. 2;

FIG. 4 is a cross section taken in the direction of arrows 4—4 of FIG. 2;

FIG. 5 is a cross section similar to FIG. 3 showing an alternate arrangement for controlling the setpoint of the blending valve and for presetting different ratios of hot to cold water admitted to the valve for blending purposes; and FIG. 6 is a fragmentary cross section taken in the direction of arrows 6—6 of FIG. 5.

DESCRIPTION OF PREFERRED EMBODIMENT

In the blending hot water heater system shown in FIG. 1, a steam supply is admitted through one end of a heating tube 10 positioned within a conventional heat exchanger 11, and steam condensate leaves the other end of the heating tube. Cold water, from a cold water supply line 12, enters the heat exchanger 11 through a cold water inlet line 13, is heated in the exchanger and leaves the exchanger through a hot water outlet line 14. The hot water line 14 communicates with one side of a blending valve 15, and the cold water supply line 12 communicates with the other side of the blending valve 15. The hot and cold water supplied to the valve 15 are blended therein in predetermined proportions and leave the valve as temperate hot water through the valve outlet line 16. This temperate hot water is supplied to faucets, and therefore there is a flow of temperate hot water through line 16 only when a faucet is opened to create a demand. It will also be readily apparent that there is a flow of cold water through lines 12 and 13 and of hot water through line 14 only when the demand for temperate hot water creates a flow thereof from the blending valve through its outlet line 16.

The flow of hot and cold water to the blending valve is controlled in response to the demand for temperate hot water by connecting both the demand side and one of the inlet sides of the blending valve to a control element such as a differential diaphragm 17 or a piston actuator. The control element is thus connected by a demand sense line 18 and a supply line 19 to sense a difference in pressure in the blending valve demand and supply lines; in the case of no demand, the pressure in the demand line 16 and in the supply lines 12 and 14 are identical, but when a faucet is opened to create a demand a pressure drop is produced in the demand line 16 and a pressure difference between this line and a supply line is sensed by the control element. The control element, such as the diaphragm 17, is connected by a mechanical linkage 20 to the blending valve 15 in such manner as to increase the flow of hot and cold water in the predetermined proportions into and through the valve to the valve outlet or demand line 16.

A unique blending valve constructed according to the present invention for use in the hot water system of FIG. 1 has been illustrated in FIGS. 2-4. The blending valve comprises a generally cylindrical two-part valve body 21 bolted at the top thereof to a diaphragm housing 22 which includes the diaphragm 17. Immediately beneath the center of the diaphragm 17 is a plate 23 which is secured to the valve stem 24. The housing 21 forms an internal abutment 26 upon which rests a spring retainer 27, the retainer 27 being slideable with respect to the valve stem 24. Interposed between the retainer 27 and a shoulder 23a of the plate 23 is a helical spring 28 which under no-flow conditions maintains the valve stem 24 plate 23 and diaphragm 17 in the position shown in FIG. 2.

As illustrated in both FIGS. 1 and 2, cold water supply pressure is admitted to the housing 22 above the diaphragm 17 and demand flow pressure from tempered water outlet 16 of the blending valve 15 is admitted beneath the diaphragm 17. Accordingly, the diaphragm 17 will sense differences in demand flow as a differential in pressure between the cold water supply pressure and demand pressure produced by differing flow conditions of the blended water output. In response to demand flow conditions, therefore, the diaphragm 17 may move axially downwardly or upwardly in accordance with the above-mentioned differential pressure conditions across the diaphragm.

The valve stem 24 has a lower reduced diameter reaction 24a which forms a shoulder 24b. Beneath and engaging the shoulder 24b is a collar 30 and immediately beneath the collar 30 is a valve member 31. The valve member 31 is normally held upwardly against the collar 30 by a spring 28 mounted upon retainer 29, which is secured to the stem 24. Intermediate the spring 28 and valve member 31 and between the collar 30 and valve member 31 are self-lubricating washers 35, 35' which permit member 31 to rotate freely relative to stem 24.

Surrounding the upper portion valve member 31 is a sleeve 32 which has been provided with a helical groove 32a. A key 31a, integral with the valve member 31 is within the groove 32a and consequently axial movement of the valve member through the agency of valve stem 24 and collar 30 will cause the valve member 31 to rotate as well as to translate in an axial direction.

As best seen in FIG. 4, the valve member 31 defines ports or windows 31b, 31c adjacent to a cold water inlet 34, and a port or window 31d adjacent to a hot water inlet 36. The window 31c in the cold water side is an auxiliary whose function will be explained presently. It will be understood that normal operation calls for windows 31b and 31d to be varied in size in registry with inlets 34 and 36 as different demand flow conditions cause translation and rotation of valve member 31.

FIG. 4 shows the valve member 31 in its fully stroked position which is to say with the maximum admission of hot water relative to cold water. Should the valve member stick in the position shown in FIG. 4, the present invention provides means for opening the cold water window 31c. It will be observed that valve stem 24 is free to move upward axially relative to valve member 31 in accordance with upward movement of the diaphragm 17. The auxiliary cold water window 31c is normally sealed by a plug 40 which is held against the window opening by leaf spring 41 which abuts the periphery of retainer 29. Should the valve member 31 stick in its downwardmost position, and demand flow conditions change sufficiently for the valve stem 24 to move upwardly, the retainer 29 will no longer maintain the spring 41 firmly against the plug 40 and the latter will move away from its seat against the cold water window 31c. Consequently, cold water for mix purposes will be admitted through the auxiliary window 31c until valve member 31 returns to its normal position or until maximum demand flow conditions again exist.

The invention further contemplates controlling the setpoint of the valve member 31 so that the temperature of the blended water from outlet 16 can be regulated. Accordingly, in the embodiment of FIG. 2 as seen with respect to FIGS. 2 and 3, the valve body 21 has a groove 21a which admits the end of a threaded pin 42. The latter is attached to the sleeve 32 and when the projecting portion 42a of the pin 42 is rotated, a consequent rotation of the sleeve 32 will take place. Since the valve member 31 is secured to the sleeve 32 by means of the key 31a, rotation of the sleeve 32 will effect a corresponding rotation of the valve member 31. Thus the initial relative proportion of cold to hot water admitted through windows 31b and 31d can be regulated by changing the position or setpoint of the pin 42 in a rotational sense relative to the valve body 21.

In the embodiment of FIGS. 5 and 6, a variation of the setpoint control just discussed has been illustrated, which further includes in combination therewith an adjustment for varying the ratio of hot to cold water admitted to the valve 15 for blending. In the case of the structure according to FIG. 5, the pin 44 is integrally attached to the plate 46 having a keyway 47 which receives the key 31a of the valve member 31. As shown in FIG. 6, the plate 46 may be rotated to vary the angle of the keyway from a completely vertical direction to inclined directions. Consequently, the key 31a traveling in the keyway 47 will effect more or less rotation of the valve member 31 and in the case of a vertical arranged keyway 47, no rotation of the valve member 31 will occur when the valve member is moved in an axial direction. Thus greater or lesser rotation of the valve member and consequent varying ratios of hot to cold water admitted through ports 31b–31c in response to the demand flow, can be preset into the valve.

Although not specifically illustrated, the setpoint device of FIG. 3 and the setpoint hot to cold water ratio and adjustment device of FIGS. 5 and 6 will be provided with a locking means to prevent shifting after the settings have been made.

It will therefore be seen that the structure of the blending valve according to the present invention provides a means in response to demand flow conditions of translating and rotating the valve member and for changing the sizes of the ports for admitting cold and hot water to the interior of the blending valve. The valve therefore is designed automatically to adjust the proportions of hot and cold water so as to maintain constant mixed temperature. The structure of the valve further provides for an auxiliary cold water inlet which will open should the valve member stick in its maximum stroke and minimum cold water inlet position. In accordance with further aspects of the unique valve structure, the setpoint of the valve member can be readily changed and the valve characteristic itself controlled by an adjustment which permits regulating the amount of rotation which can take place during axial translation of the valve member.

It will be understood that the foregoing description relates to preferred embodiments according to the invention and is therefore merely representative. In order to fully appreciate the spirit and scope of the invention reference should be made to the appended claims.

We claim:

1. A blending valve for mixing hot and cold water to produce tempered water of a prescribed temperature comprising a generally cylindrical valve body, a valve stem axially movable within said body, a diaphragm responsive to differentials in pressure between no-flow and demand flow conditions of said tempered water, means connecting said diaphragm to said valve stem to move the latter axially in response to said pressure differentials, a hollow generally cylindrical valve member movable in an axial direction by said valve stem and being rotatable with means for causing progressive rotation of said valve member as it moves axially, said valve member defining ports for the admission to the interior thereof of hot and cold water, a hot and cold water inlet adjacent to each of said ports in registry therewith such that axial and rotational movement of said valve member will vary the opening size of each said port with respect to each said hot and cold water inlet.

2. A blending valve according to claim 1 wherein a cylindrical sleeve is provided within said valve body defining a helical groove therein in an axial direction, said valve member having a key projecting within said groove, spring means intermediate said body and diaphragm for urging said diaphragm against differential pressures caused by demand flow tempered water conditions.

3. A blending valve according to claim 2 wherein said valve member is axially slidable of said valve stem, means in association with said stem for carrying said valve member downwardly in response to increasing demand flow conditions and spring means for urging said valve member upwardly to normally return said valve member with said valve stem, an auxiliary port defined by said valve member adjacent to said cold water inlet, plug means intermediate said auxiliary port and said valve stem for sealing said port, leaf spring means carried by said stem for urging said plug into sealing relationship against said auxiliary port when said stem and valve member travel together, and means on said stem for releasing said leaf spring means when said stem travels upwardly relative to said valve member thereby permitting cold water to flow past said plug through said auxiliary port and to mix with hot water internally of said valve member.

4. A blending valve according to claim 2 wherein means are provided for rotating said sleeve to effect rotation of said valve member thereby changing the setting of said ports in relation to the cold and hot water inlets.

5. A blending valve according to claim 1 wherein a cylindrical sleeve is provided intermediate said valve body and said valve member, a generally circular section of said sleeve is freely rotatable with respect thereto, a straight keyway in said circular section, a key connected to said valve body projecting within said keyway, means for rotating said section relative to said key between vertical and inclined positions of said keyway, and means for moving said circular section and together therewith said sleeve in rotation about said valve stem whereby said valve member can be made to translate without rotation or have varying degrees of rotation and whereby the setpoint of said ports relative to said hot and cold water inlet openings can be adjusted.

6. A blending valve according to claim 5 wherein means are provided for rotating said sleeve to effect rotation of said valve member thereby changing the setting of said ports in relation to the cold and hot water inlets.

\* \* \* \* \*